（12) United States Patent
Thobe et al.

(10) Patent No.: US 11,041,813 B2
(45) Date of Patent: Jun. 22, 2021

(54) INSPECTION APPARATUS FOR OPTICALLY INSPECTING AN OBJECT, AND OBJECT INSPECTION SYSTEM

(71) Applicant: Robert Bosch GmbH, Stuttgart (DE)

(72) Inventors: Alexander Thobe, Stuttgart (DE); Martin Berger, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/604,376

(22) PCT Filed: Feb. 23, 2018

(86) PCT No.: PCT/EP2018/054458
§ 371 (c)(1),
(2) Date: Oct. 10, 2019

(87) PCT Pub. No.: WO2018/197074
PCT Pub. Date: Nov. 1, 2018

(65) Prior Publication Data
US 2020/0150050 A1    May 14, 2020

(30) Foreign Application Priority Data
Apr. 27, 2017   (DE) .......................... 102017207071.4

(51) Int. Cl.
*H04N 7/18*       (2006.01)
*G01N 21/88*      (2006.01)
(Continued)

(52) U.S. Cl.
CPC ......... *G01N 21/8806* (2013.01); *G01B 11/24* (2013.01); *H04N 5/2252* (2013.01);
(Continued)

(58) Field of Classification Search
CPC ......... G01N 21/8806; G01N 21/95684; G01N 2021/95638; G01N 21/956;
(Continued)

(56) References Cited

U.S. PATENT DOCUMENTS 5,060,065 A    10/1991 Wasserman
2002/0179679 A1    12/2002 Kim et al.
(Continued)

FOREIGN PATENT DOCUMENTS

DE    19623949 A1    12/1997
DE    69032724 T2    7/1999
(Continued)

OTHER PUBLICATIONS

International Search Report dated May 17, 2018 of the corresponding International Application PCT/EP2018/054458 filed Feb. 23, 2018.

*Primary Examiner* — Masum Billah
(74) *Attorney, Agent, or Firm* — Norton Rose Fulbright US LLP; Gerard Messina

(57) ABSTRACT

The quality of objects and workpieces of a manufacturing process is often evaluated based on surface and/or form. An inspection apparatus for optically, in particular deflectometrically, inspecting an object includes a hollow body housing having an opening, the object being positionable in the opening for the inspection; a camera having a plane of focus and a camera direction extending toward the opening of the housing, and being configured to take a plurality of object images of the object situated in the plane of focus; a plurality of light sources arranged around the opening and designed for variably illuminating the plane of focus; and an evaluation unit configured to determine a topography of the object based on the object images.

17 Claims, 2 Drawing Sheets

(51) Int. Cl.
*G01B 11/24* (2006.01)
*H04N 5/225* (2006.01)
*H04N 5/247* (2006.01)

(52) U.S. Cl.
CPC ......... *H04N 5/2253* (2013.01); *H04N 5/2256* (2013.01); *H04N 5/247* (2013.01); *G01N 2021/8829* (2013.01)

(58) Field of Classification Search
CPC ... G01N 2021/8812; G01N 2021/8819; H04N 1/0287; H04N 1/0289; H04N 1/02895; H04N 2013/0081; H04N 5/225; H04N 5/2256; H04N 5/2354
USPC .......................................................... 348/92
See application file for complete search history.

(56) References Cited

U.S. PATENT DOCUMENTS

| | | | |
|---|---|---|---|
| 2004/0150822 | A1 | 8/2004 | Yu et al. |
| 2006/0180775 | A1* | 8/2006 | Paradis .............. G01N 21/9036 250/559.42 |
| 2006/0231700 | A1* | 10/2006 | Orf ........................ F16C 11/10 248/187.1 |
| 2018/0005365 | A1* | 1/2018 | Kimura ................ G01B 11/245 |

FOREIGN PATENT DOCUMENTS

| | | |
|---|---|---|
| JP | 2010060312 A | 3/2010 |
| JP | 2013185994 A | 9/2013 |
| JP | 2015508499 A | 3/2015 |
| KR | 101376274 B1 | 3/2014 |

* cited by examiner

INSPECTION APPARATUS FOR OPTICALLY INSPECTING AN OBJECT, AND OBJECT INSPECTION SYSTEM

CROSS-REFERENCE TO RELATED APPLICATIONS

The present application is the national stage of International Pat. App. No. PCT/EP2018/054458 filed Feb. 23, 2018, and claims priority under 35 U.S.C. § 119 to DE 10 2017 207 071.4, filed in the Federal Republic of Germany on Apr. 27, 2017, the content of each of which are incorporated herein by reference in their entireties.

FIELD OF THE INVENTION

The present invention relates to an inspection apparatus for optically, in particular deflectometrically, inspecting an object, the apparatus including: a housing, the housing being a hollow body having an opening, the object being positionable in the opening for the inspection: a main camera having a camera direction and a plane of focus and being configured with the camera direction extending toward the opening of the housing; and a plurality of light sources arranged around the opening and being designed for variably illuminating the plane of focus, the main camera being designed to take a plurality of object images of the object situated in the plane of focus.

BACKGROUND

Illumination devices are often used to measure and/or inspect the surface quality of objects. A camera thereby takes images of the object, a diffuser dome being used to illuminate the object.

The publication, German Patent Application DE 196 23 949 A1, describes an apparatus for optically inspecting the surface of objects including an illumination device, which, via a diffuser dome, illuminates the subjacent object, a video camera, whose lens system is positioned at the upper end of the diffuser dome, and an evaluation device, which has a computer with desired image or desired grayscale values of predefined surfaces of the object stored therein. The image taken by the camera is compared to these in order to generate a discard signal when the deviation between the actual and desired image has a specified magnitude. The illumination device has white-light lamps which are always on.

SUMMARY

According to an example embodiment of the present invention, an inspection apparatus is provided for optically, in particular deflectometrically inspecting an object. An example embodiment of the present invention is directed to an object inspection system including an inspection apparatus. Example embodiments of the present invention will become apparent from the following description and enclosed figures.

The present invention provides an inspection apparatus for optically, in particular deflectometrically inspecting an object. In particular, the inspection apparatus is designed for automatically inspecting the object. The object is a workpiece and/or a component, for example, the object having, in particular a shiny and/or reflective surface. The deflectometric inspection of the object equates, for example, to an optical inspection of the surface of the object. In particular, the inspection apparatus is designed to enable a deflectometric inspection for a variable object spectrum.

The inspection apparatus has a housing. The housing is a hollow body having an opening. In particular, the housing has an interior. The housing is, for example, a cut open hollow body, the cut open hollow body having a surface section, the surface section forming the opening of the hollow body. In addition, the housing preferably has an interior and an exterior. The object can be positioned in the opening for purposes of inspection. In particular, the object can be positioned in the center of the opening, the center position in the opening preferably being the optimal inspection and/or working position of the object. In particular, the opening of the housing has a rim, the rim limiting the hollow body. The opening in the housing is circular, elliptical, triangular, or any polygon, for example.

The inspection apparatus has a main camera. In particular, the main camera includes a zoomable camera, the main camera having variable image fields and/or magnifications. The main camera is preferably a video camera. Alternatively, the main camera is a single-image camera. In particular, the main camera is a CCD camera and, in the specific case, a color camera or a monochrome camera. Alternatively, the main camera is a CMOS camera. The main camera has a camera direction and a plane of focus. In particular, the camera direction is orthogonal to the plane of focus. The camera direction is, in particular the direction in which the main camera takes images. The plane of focus is preferably the plane in which the main camera is able to form a sharp image of an object. For example, the plane of focus is the plane having maximum depth of focus.

The main camera is configured with the camera direction extending toward the opening of the housing. In particular, the main camera points with the camera direction thereof through the opening of the housing. The main camera is preferably positioned so that the camera direction thereof extends centrally through the opening of the housing. It is also preferably provided that the main camera be positioned so that the camera direction thereof is orthogonal to a plane spanned by the opening of the housing.

The inspection apparatus has a plurality of light sources. In particular, the inspection apparatus has more than five light sources, preferably more than 20 light sources and, in the specific case, more than 50 light sources. The light sources are preferably LEDs. In particular, the light sources are white light sources or colored light sources and, in the specific case, RGB light sources. The light sources are preferably point light sources. Alternatively and/or additionally, the light sources are planar light sources. The light sources are preferably thermal light sources having a radiation pattern within a broad wavelength region that is based, for example, on Planck's law of radiation. Alternatively and/or additionally, the light sources are non-thermal light sources, the non-thermal light sources being line and/or band emitters, in particular.

The light sources are configured around the opening in the housing. In particular, the light sources are configured along the rim of the opening. Alternatively and/or additionally, the light sources are configured in the interior of the housing. The light sources are designed for variably illuminating the plane of focus. Variable illumination is understood, in particular to be an illumination that changes in response to the light sources. A variable illumination is, for example, a change in the color composition of the light emitted by the light source and/or a change in the illumination direction that is effected by the plurality of light sources. For example, at a point in time t1, the focusing region is illuminated by all of the light sources; at another point in time t2, the focusing region is illuminated by a subset of the plurality of light sources; and, at a point in time t3, the plane of focus is illuminated by another subset of the plurality of light sources. In particular, the light sources are configured to allow the main camera to record and/or image the plane of focus brightly, sharply, and/or at a high contrast.

The main camera is designed to take a plurality of object images of the object situated in the plane of focus. In particular, the main camera is designed to take more than two, preferably more than 10 and/or, in the specific case, more than 50 object images of the object located in the plane of focus. The object images are preferably spaced at time intervals, in particular at equidistant time intervals, the time interval between two object images being longer than one millisecond and/or shorter than one second, for example. In the specific case, the main camera is a video camera and designed to take a multiplicity of object images, in particular as a video sequence, of the object located in the plane of focus.

The inspection apparatus includes an evaluation unit. In particular, the evaluation unit communicates with the main camera by data link, the object images being made and/or becoming available to the evaluation unit by data link. The evaluation unit is designed to determine a topography of the object based on the object images. As topography, the evaluation unit is designed, in particular to determine a slope map based on the object images of the object. In particular, the evaluation unit is designed to reconstruct the surface of the object based on the object images, the topography, and/or the slope map.

Embodiments of the present invention provide an inspection apparatus that will make it possible to rapidly, automatically, and/or reliably determine a surface topography and/or slope map of an object. The inspection apparatus advantageously makes it possible for the surface topography to be reliably and rapidly determined, all elements needed therefor being united in an inspection apparatus.

In an example embodiment of the present invention, the housing includes a recess designed as a lead-through and/or mount for a holding device and/or a handling device of the object. The recess is designed, in particular, as a lead-through and/or mount for the object. The holding device is an axis system, for example. The handling device is a robot and/or robot arm, for example. The holding device and/or the handling device are/is designed for holding, positioning, and/or rotating the object. In particular, the recess is designed to enable the object to be positioned in the plane of focus in a multitude of positions, preferably in all relevant and/or necessary positions for determining the topography. This embodiment is based on the idea of providing an inspection apparatus which includes a housing and can be used in a collision-free manner to determine the topography of an object, including a holding device and/or a handling device of the object, the object being positionable in the plane of focus in a multitude of positions.

In particular, the recess is directly contiguous to the opening of the housing. In particular, the recess and the opening are not separated from each other by any material. The recess is to be regarded as a direct enlargement of the opening, for example. This embodiment is based on the idea of being able to use a holding device and/or handling device, for example, in all angular positions relative to the recess.

In an example embodiment of the present invention, the recess is circular and/or elliptical. In particular, the recess is a circular segment, such as a semicircular segment, for example. Alternatively, the recess is any polygon, such as a triangle, a rectangle, or a hexagon. In particular, the recess is formed in such a way that the remaining solid angle, which is spanned by the housing, is preferably as large as possible. In particular, the recess can be adapted to the form of the holding device, the handling device, and/or the object. In particular, the light sources, which are configured around the opening and are for a housing with a recess, are position in a laurel wreath configuration. The recess is preferably located at least partially outside of the plane spanned by the opening and/or of the plane of focus. This embodiment is based on the idea of providing an inspection apparatus having a housing that the recess influences and/or reduces as little as possible, so that as little as possible scattered light and/or stray light impinges on the camera and/or the plane of focus, for example.

In an example embodiment of the present invention, the light sources are configured uniformly and/or equidistantly about the opening in the housing. In particular, the light sources are configured uniformly and/or equidistantly on the rim, which forms the boundary at the opening to the housing. The light sources are preferably configured around the opening to contact one another and/or be mutually tangential. The light sources can also be configured equidistantly and/or uniformly in the entire housing of the inspection apparatus, for example, the same number in each solid angle part ($\Delta\Omega$). This embodiment is based on the idea of providing an inspection apparatus that will permit a most uniform and constant possible illumination of the object in the plane of focus.

In an example embodiment, the light sources have an emission direction, in particular the direction in which the light source emits light with maximum intensity. In each case, the emission direction of every light source forms an illumination angle with the camera direction of the main camera. The illumination angle of at least one of the light sources is variable. In particular, the illumination angle of all of the light sources is variable. The illumination angle is preferably orientable, for example reversibly orientable. For example, the light source includes a base and/or a socket, the base and/or the socket being swivel-mounted on the housing and/or the rim to vary the illumination angle. This embodiment is based on the idea of providing an inspection apparatus where the illumination angle of the light sources is variable and/or adjustable, to make possible a best possible illumination and/or lighting during the inspection.

It is especially preferred that the housing be dome-shaped and/or hemispherical. In particular, the housing is dome-shaped. It is also possible that the housing be designed to be cylindrical, cone-shaped and/or conical, for example. In particular, the dome-shaped and/or hemispherical housing has an opening that constitutes a plane surface section, for example. This embodiment is based on the idea of providing a housing that has a most spacious possible interior, allowing ready manipulation and/or rotation of the object in the interior.

It is especially preferred that the inspection apparatus include a plurality of auxiliary cameras. In particular, the inspection apparatus has more than 10 auxiliary cameras, more preferable more than 20 auxiliary cameras and, more preferably more than 30 auxiliary cameras. The auxiliary cameras are, for example, digital cameras and/or image sensors. The auxiliary cameras are designed as color cameras or monochrome cameras, for example. In particular, the auxiliary cameras each has a camera unit that includes the image sensor in order to take an image. The camera unit preferably has a diameter of less than five millimeters, for example, more particularly, a diameter of less than two millimeters. The auxiliary cameras are configured in the housing. In particular, the auxiliary cameras are configured around the main camera. It is especially preferred that the auxiliary cameras be configured around the opening of the housing.

The auxiliary cameras are designed for taking auxiliary images of the object. In particular, the auxiliary images image a subregion and/or the entire object in the focusing region. The auxiliary images have, in particular at least one overlap with at least one of the object images. In particular, the auxiliary cameras are configured to be able to image the object within the plane of focus sharply and/or at a high contrast. Alternatively and/or additionally, the auxiliary cameras are configured to be able to image the object outside of the plane of focus sharply and/or at a high contrast. The evaluation unit is preferably designed to determine the topography of the object based on the auxiliary images. In particular, the evaluation unit is designed to refine and/or update the topography determined based on the object images based on the auxiliary images. Alternatively and/or additionally, based on the auxiliary images, the evaluation unit is designed to update the topography of the object in regions that were not covered by the object images. The auxiliary cameras are preferably configured to allow a change in perspective of the recorded image of the object. This embodiment is based on the idea of providing an inspection apparatus that provides a plurality of images, perspectives, and/or views of the object by using auxiliary cameras, it being possible to determine the topography based on the auxiliary images and the object images, making possible an especially accurate measurement of the topography of the object, for example.

In an example embodiment of the present invention, the auxiliary cameras have different focal lengths and/or different focusing regions. In particular, in an example embodiment, the auxiliary cameras have adjustable and/or variable focal lengths. The focusing region of the auxiliary cameras is preferably greater than and/or equal to that of the main camera. This embodiment is based on the idea of using a plurality of auxiliary cameras to provide an inspection apparatus that makes it possible to image the object using different focal lengths and/or object details, the service life of the inspection apparatus not being limited by a maximum number of zoom cycles of the main camera.

The auxiliary cameras preferably have an electronic board and the camera unit. The camera unit includes, in particular an optical unit, such as a lens system, for example, and/or a lens, as well as an image sensor. The camera unit is and/or includes a CCD or a CMOS camera, for example. The electronic board is designed to control the camera unit, supply power thereto, and/or archive the data of recorded images and/or provide them to a user. The electronic board preferably communicates via a flexible connection with the camera unit. The flexible connection is a flexible cable, for example. In particular, in an example, the camera unit is configured in the housing of the inspection apparatus, the electronic board being configured outside of the housing of the inspection apparatus, the flexible connection linking the camera unit in the housing to the electronic board outside of the housing. This embodiment is based on the idea of configuring the auxiliary cameras with a minimal footprint and/or degree of coverage of the main camera in the housing by placing the electronic component of the camera unit outside of the housing, this component not being able to limit the field of view of the main camera.

It is especially preferred that the interior of the housing be reflective. For example, the interior of the housing is a specular surface, such as a silver-plated mirror, for example. Alternatively, in the interior, the housing is absorptive, such as dull black, and is designed as a light trap for stray light and/or scattered light. In particular, the absorption coefficient of the housing in the interior is approximately one. This embodiment is based on the idea of providing an inspection apparatus that efficiently scatters light and illuminates the object in the plane of focus as effectively as possible and, on the other hand, on the idea of intercepting scattered light as effectively as possible, making it possible to readily reconstruct the topology of the object.

It is especially preferred that the opening in the housing define an opening plane. The opening plane is preferably a flat and/or even plane. Alternatively, the opening plane is a curved surface. In particular, the opening plane and the plane of focus coincide. Alternatively and/or additionally, the opening plane and the plane of focus are mutually parallel offset. This embodiment is based on the idea of providing an inspection apparatus where as little as possible ambient light of the inspection apparatus interferes with the measurement upon measurement of the object, the object being exactly located in the opening plane during the inspection and thereby partially surrounding the opening plane.

An example embodiment of the present invention is directed to an object inspection system that includes the described inspection apparatus, as well as at least one handling device for handling and/or holding the object. The handling device is a robot, for example, a robot arm and/or an axis system, the object being clampable in the handling system, for example. The handling device is designed for holding, positioning, and/or rotating the object. In addition, the handling device is designed for at least partially rotating and/or swiveling the object within the plane of focus, the inspection apparatus recording the topology of the object while the object in the plane of focus is held by the handling device. In particular, in an example, the handling device is designed for rotating the object upon determination of the topology by the inspection apparatus, so that the object inspection system is designed for determining the topology of the entire object and/or nearly of the entire object. In particular, the object inspection system is designed for performing an all-around inspection of the object. Thus, the object inspection system makes it possible for a handling device to handle and/or hold an object while the object is measured by an inspection apparatus, the handling device being able to interact in a collision-free manner with the inspection apparatus.

Other features, advantages and effects of the present invention are derived from the following description of preferred example embodiments thereof with reference to the drawings.

DETAILED DESCRIPTION

Figure 1:
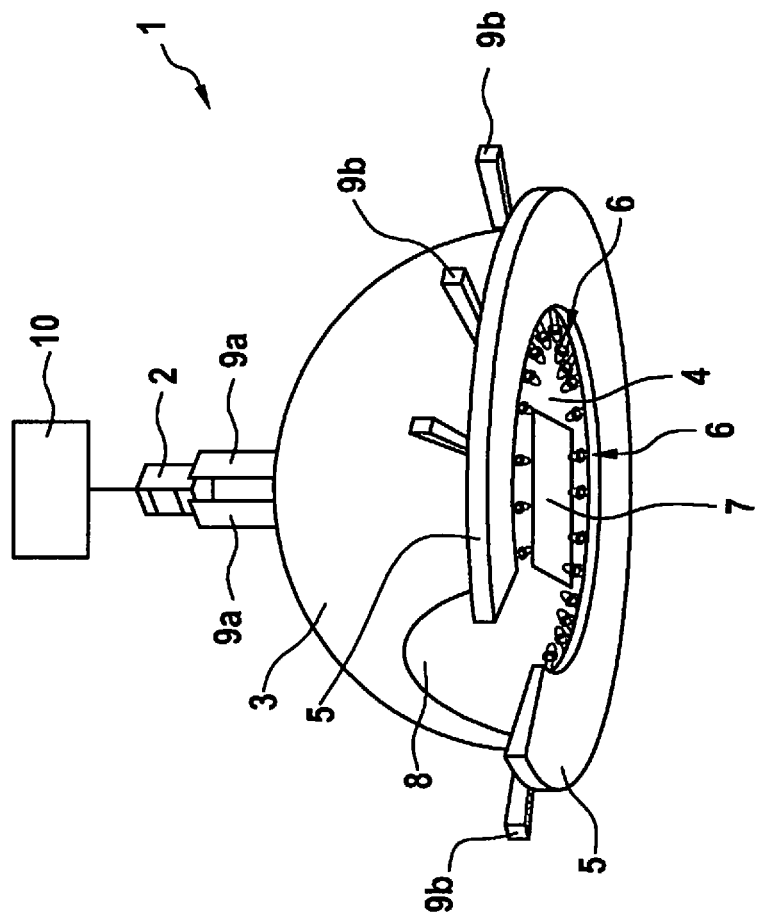
FIG. 1 shows an inspection apparatus according to an example embodiment of the present invention.

FIG. 1 shows an inspection apparatus 1 having a main camera 2 and a housing 3. Housing 3 is a domed hollow member, in this example embodiment, a hemispherical hollow member. The hemispherical hollow member is sliced in the equatorial plane, in particular. Housing 3 has an opening 4. In this example embodiment, opening 4 is a circular opening 4. Housing 3 has an outer region and an inner region, the inner region preferably being reflective. Alternatively and/or additionally, the inner region can be absorptive. Main camera 2 is located on the side of housing 3 opposite opening 4, in this example embodiment, at a pole of hemispherical housing 3.

Main camera 2 has a camera direction extending toward opening 4 of housing 3. In particular, camera 2 has a focal length, so that main camera 2 is able to image the region of opening 4 of housing 3 sharply and/or at a high contrast. In particular, main camera 2 has an electronic component located outside of housing 3, so that, in particular, only the lens and/or lens system of main camera 2 are/is configured in housing 3 with the direction of view extending toward opening 4.

Housing 3 has a rim 5, rim 5 forming the boundary of housing 3 to opening 4. In this example embodiment, rim 5 has a circular formation. Light sources 6 are configured along rim 5, in particular around opening 4. In particular, light sources 6 are light-emitting diodes. Light sources 6 have an emission direction, which, in this example embodiment, is centrally directed into the center of circular opening 4. In particular, light sources 6 are swivel-mounted on rim 5, making the angle between the camera direction of main camera 2 and the emission direction of light sources 6 variable. In this example embodiment, the angle formed by the emission direction of light sources 6 and by the camera direction of main camera 2, in particular the illumination angle, is 90 degrees. The illumination angles of light sources 6 are preferably electronically adjustable and/or re-adjustable. Light sources 6 are designed to illuminate the region of opening 4, all or only parts of light sources 6 being usable for illumination. In particular, light sources 6 are designed to render possible a different illumination of opening 4, for example, by changing the light color and/or active light sources 6.

In particular, opening 4 spans a plane coinciding with the plane of focus of main camera 2. An object 1 can be placed in the plane of focus of main camera 2. Object 7 is an electronic or mechanical component, for example. In particular, object 7 has a shiny surface. Object 7 is preferably pivotable and/or rotatable in the region of the plane of focus.

Inspection apparatus 1 and/or housing 3 has a recess 8, in particular a recess of housing 3. In particular, recess 8 directly adjoins opening 4. In this example embodiment, recess 8 is a semicircular recess in the housing. Recess 8 is designed to receive a holder of object 7 and/or a handling device for object 7, for example, an axis system which holds object 7 in opening 4. Recess 8 is preferably smaller than or equal to the diameter of object 7, recess 8 being designed here only for receiving the handling system and/or the holder.

Inspection apparatus 1 includes a plurality of auxiliary cameras 9a and 9b. Auxiliary cameras 9a and 9b are in the form of digital cameras and configured in housing 3 to image object 7 in the focusing region and/or opening 4 sharply and/or at a high contrast. Auxiliary cameras 9a directly adjoin main camera 2 and are oriented by the camera direction thereof parallel to the camera direction of main camera 2. Auxiliary cameras 9a feature, in particular, a different focal length and/or depth of focus than main camera 2. Auxiliary cameras 9b are located, in particular, in the area of rim 5 of housing 3. Auxiliary cameras 9a and 9b likewise point by the camera direction thereof toward object 7. In particular, the camera direction of auxiliary cameras 9b forms an angle of greater than 80 degrees with the camera direction of main camera 2. Auxiliary cameras 9b are designed for taking auxiliary images of object 7. Main camera 2 is designed for taking object images of object 7.

Inspection apparatus 1 includes an evaluation unit 10 designed for determining the topography and/or a slope map of object 7 based on object images that were taken by main camera 2, as well as based on auxiliary images that were taken by auxiliary cameras 9a, 9b. The evaluation unit is designed, for example, as a microchip, a microcontroller and/or as a computer unit. In particular, it is possible for evaluation unit 10 to be integrated in main camera 2.

Figure 2:
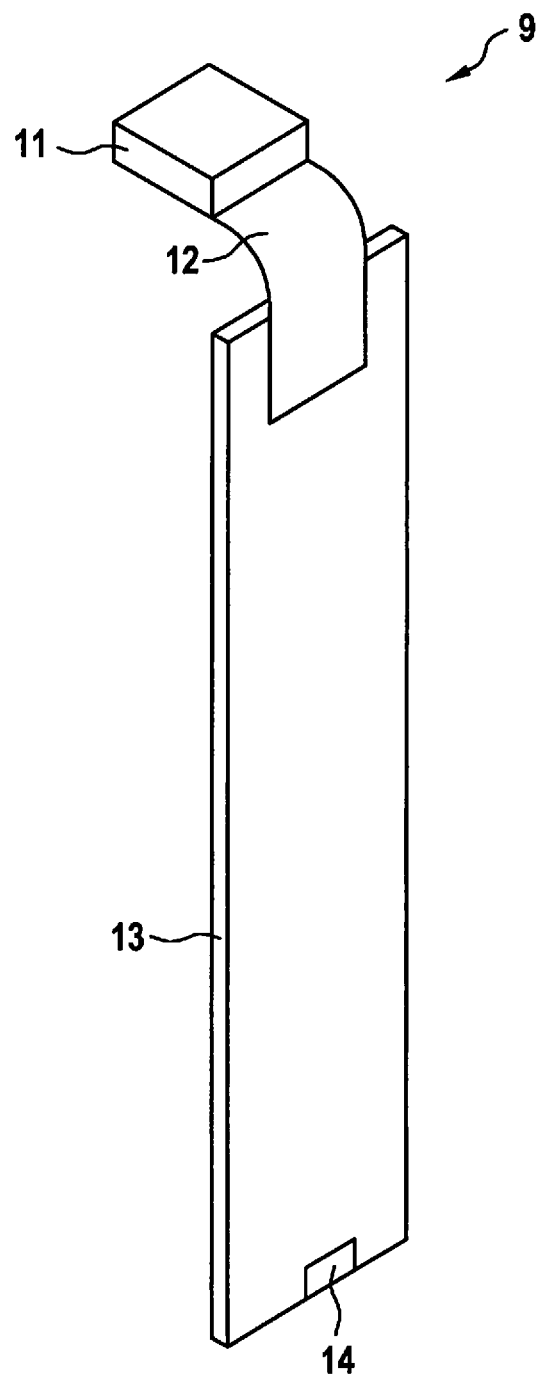
FIG. 2 shows an auxiliary camera having an electronic board and camera unit according to an example embodiment of the present invention.

FIG. 2 shows an auxiliary camera 9 that features a camera unit 11, a flexible connection 12, and an electronic board 13. The camera unit includes, in particular a camera sensor, for example, a CCD or a CMOS chip. In addition, camera unit 11 includes a lens unit that a lens, for example, and that is designed for sharply imaging an image onto the camera sensor. Camera unit 11 preferably has a diameter of less than ten millimeters.

Electronic board 13 is designed for controlling camera unit 11 and/or for supplying power thereto. In particular, electronic board 13 includes all electronic components that are needed for controlling or evaluating data from camera unit 11. Electronic board 13 preferably includes a board interface 14. Board interface 14 is designed for making available via a data link the auxiliary images provided by auxiliary camera 9 and, in the specific case, by camera unit 11. In particular, board interface 14 can be coupled by a data link to evaluation unit 10 of inspection apparatus 1.

Electronic board 13 is linked to camera unit 11 via a flexible connection 12. Flexible connection 12 is a flexible cable, for example, which connects camera unit 11 by a data link and/or electronically to electronic board 13. In particular, flexible connection 12 is designed for aligning camera unit 11. Flexible connection 12 is preferably flexurally stiff or flexurally elastic. Flexible connection 12 is designed as a lead-through from the interior of housing 3 to the exterior of housing 3 of the inspection apparatus, the flexible connection linking camera unit 11 located in the interior of housing 3 to electronic board 13 located on the exterior of housing 3.

What is claimed is:

1. An inspection apparatus for optically inspecting an object, comprising:
   a housing that includes a hollow body with an opening in which the object is positionable for the inspection;
   a first camera directed to a plane of focus, in a direction towards the opening of the housing, wherein the first camera is configured to take a plurality of object images of the object situated in the plane of focus;
   a plurality of light sources arranged around the opening, wherein the light sources are configured to variably illuminate the plane of focus; and
   a processor, wherein the processor is configured to determine a topography of the object based on the object images;
   wherein the housing includes a rim forming a boundary of the housing to the opening,
   wherein the plurality of light sources are configured along the rim,
   wherein the plurality of light sources have an emission direction, which is directed into a center of the opening, and
   wherein the plurality of light sources are movably mounted on the rim, so that an angle between a camera direction of the first camera and the emission direction of the plurality of light sources is adjustable.

2. The inspection apparatus of claim 1, wherein a recess is formed in the housing and through which a holding device or handling device of the object is insertable or via which the holding device or handling device is mountable.

3. The inspection apparatus of claim 2, wherein the recess is contiguous to the opening.

4. The inspection apparatus of claim 2, wherein the recess is a circular segment or is elliptical.

5. The inspection apparatus of claim 2, wherein the light sources are positioned around the opening in a circular configuration with an opening at one side and/or are interrupted by the recess.

6. The inspection apparatus of claim 2, wherein the object is positionable in the plane of focus by the the holding device or handling device when the holding device or handling device is partially positioned in the recess.

7. The inspection apparatus of claim 1, wherein the light sources are arranged uniformly around at least a portion of the opening.

8. The inspection apparatus of claim 1, wherein the light sources are arranged with equidistant spaces between each pair of immediately adjacent ones of the light sources in at least around at least a portion of the opening.

9. The inspection apparatus of claim 1, wherein each of the light sources has an emission direction forming an illumination angle with the camera direction, and wherein the illumination angle of at least one of the light sources is adjustable.

10. The inspection apparatus of claim 1, wherein the housing is dome-shaped and/or hemispherical.

11. The inspection apparatus of claim 1, further comprising:
a plurality of auxiliary cameras arranged around a radial position of the first camera, wherein the auxiliary cameras are configured to take auxiliary images of the object, and the processor is configured to determine or improve the topography of the object based on the auxiliary images.

12. The inspection apparatus of claim 11, wherein the auxiliary cameras have different focal lengths and/or different focusing regions.

13. The inspection apparatus of claim 11, wherein the auxiliary cameras have a sensor arranged in the housing and an electronic board arranged outside of the housing and connected to the sensor via a flexible connection.

14. The inspection apparatus of claim 1, wherein an interior of the housing is reflective or absorptive.

15. The inspection apparatus of claim 1, wherein the opening defines an opening plane that coincides with the plane of focus.

16. The inspection apparatus of claim 1, wherein the inspection apparatus is configured to deflectometrically inspect the object.

17. An inspection system for optically inspecting an object, comprising:
an apparatus, including:
a housing that includes a hollow body with an opening in which the object is positionable for the inspection;
a first camera directed to a plane of focus, in a direction towards the opening of the housing, wherein the first camera is configured to take a plurality of object images of the object situated in the plane of focus;
a plurality of light sources arranged around the opening, wherein the light sources are configured to variably illuminate the plane of focus; and
a processor, wherein the processor is configured to determine a topography of the object based on the object images; and
a handling device via which the object is at least partially rotatable within the plane of focus;
wherein the housing includes a rim forming a boundary of the housing to the opening,
wherein the plurality of light sources are configured along the rim,
wherein the plurality of light sources have an emission direction, which is directed into a center of the opening, and
wherein the plurality of light sources are movably mounted on the rim, so that an angle between a camera direction of the first camera and the emission direction of the plurality of light sources is adjustable.

* * * * *